US008720824B2

(12) United States Patent
Martinez Fernández et al.

(10) Patent No.: US 8,720,824 B2
(45) Date of Patent: May 13, 2014

(54) JOINING ARRANGEMENT FOR THE LATERAL BOXES OF A HORIZONTAL TAIL STABILISER WITH A TUBULAR CENTRAL BOX AND MANUFACTURING METHOD FOR SAID BOX

(75) Inventors: Loreto Martinez Fernández, Madrid (ES); Antonio De Julián Aguado, Madrid (ES)

(73) Assignee: Airbus Operations S.L., Madrid (ES)

( * ) Notice: Subject to any disclaimer, the term of this patent is extended or adjusted under 35 U.S.C. 154(b) by 278 days.

(21) Appl. No.: 13/005,891

(22) Filed: Jan. 13, 2011

(65) Prior Publication Data

US 2011/0174928 A1 Jul. 21, 2011

(30) Foreign Application Priority Data

Jan. 15, 2010 (ES) .................................. 201030038

(51) Int. Cl.
*B64C 1/00* (2006.01)

(52) U.S. Cl.
USPC ................ 244/123.1; 244/123.9; 244/123.12; 244/123.7; 244/123.8; 244/124

(58) Field of Classification Search
USPC .................. 244/12.1, 123.12–123.9, 124.131
See application file for complete search history.

(56) References Cited

U.S. PATENT DOCUMENTS 1,765,791 A * 6/1930 Fokker .......................... 244/132
2,567,124 A * 9/1951 Roberts ......................... 244/124
4,051,289 A * 9/1977 Adamson ...................... 428/113
4,079,903 A * 3/1978 Ashton et al. ............. 244/123.5
5,288,355 A * 2/1994 Leffel et al. .................. 156/156
5,330,818 A * 7/1994 Langley ........................ 428/102
5,431,870 A * 7/1995 Andre ........................... 264/103
5,490,602 A * 2/1996 Wilson et al. .................. 216/56
5,567,509 A * 10/1996 Gautier ........................ 428/36.1
5,605,440 A * 2/1997 Bocoviz et al. ............... 415/200
5,806,796 A * 9/1998 Healey ...................... 244/117 R
7,182,293 B2 * 2/2007 Sarh .......................... 244/123.7
7,546,979 B1 * 6/2009 Estell et al. ............... 244/123.1
8,091,829 B2 * 1/2012 Ramirez Blanco et al. ......................... 244/123.1
2004/0011927 A1 * 1/2004 Christman et al. ............ 244/131
2008/0001029 A1 * 1/2008 Garcia Laja ................. 244/99.3
2009/0159742 A1 * 6/2009 Ramirez Blanco et al. .... 244/87
2011/0139932 A1 * 6/2011 Matheson et al. ............ 244/132

* cited by examiner

*Primary Examiner* — Tien Dinh
*Assistant Examiner* — Justin Benedik
(74) *Attorney, Agent, or Firm* — Michael Best & Friedrich LLP

(57) ABSTRACT

Joining arrangement for the lateral boxes (11, 11') of a horizontal tail stabilizer with a central tubular box and manufacturing method for said box. The boxes (11, 11') are joined using an intermediate joining part (31) that comprises a central box (33, 63, 73), upper (35, 35') and lower (37, 37') lateral flaps, fitting plates (A) for the trimming device and fitting plates (B) for the pivoting device, the join being made with rivets between the skins (15, 15'; 17, 17') of the lateral boxes (11, 11') and said flaps (35; 35'; 37; 37'). The method for manufacturing the intermediate joining part (31) comprises steps to: a) Provide preforms suitable for forming said part (31); b) Form and cure the part (31) made from said preforms using an RTM method.

10 Claims, 3 Drawing Sheets

31
11
15
35
33
35'
15'
11'
17
37
37'
17'

JOINING ARRANGEMENT FOR THE LATERAL BOXES OF A HORIZONTAL TAIL STABILISER WITH A TUBULAR CENTRAL BOX AND MANUFACTURING METHOD FOR SAID BOX

SCOPE OF THE INVENTION

This invention relates to a joining arrangement for the lateral boxes of a horizontal stabiliser of an aircraft with an intermediate part and more specifically to a joining arrangement in which said intermediate part is box-shaped.

BACKGROUND TO THE INVENTION

Currently and particularly in the aeronautical industry massive use is made of composite materials with an organic matrix and continuous fibres principally based on epoxy resins and carbon fibres in a wide variety of structural elements.

Aeronautical structures require, as is well known, the integration of various structural elements. For example, fuselages require the integration of skins with different structural elements such as beams, jambs and stringers. Unlike when metal materials were used where the use of mechanical joints was practically the only option for integrating the various structural elements of a given component, composite materials can also be integrated using chemical joints.

In certain aeronautical structures, two components must be joined such that there is an efficient transmission of load between both components which normally requires the use of intermediate parts. This occurs in particular when joining the lateral boxes of a horizontal stabiliser of an aircraft since the horizontal tail stabilizer must behave like a structural unit. Furthermore, the joint is subjected both to aerodynamic loads and to the loads generated by the mechanism used to trim the horizontal stabiliser.

As it is a problematic joint there have been various proposals both for shear joints and for traction joints and using intermediate parts made of metal, composite or mixed materials.

In one of these proposals, described in US 2009159742, a double T-shaped intermediate part made of composite material is used.

The use of these intermediate parts may be problematic for certain configurations of lateral boxes of horizontal tail stabilisers as well as for the integration of the fittings required for the trimming devices.

This invention is intended to resolve these problems.

SUMMARY OF THE INVENTION

One objective of this invention is to provide a joining arrangement between the lateral boxes of a horizontal tail stabiliser of an aircraft using an intermediate part that facilitates the assembly of said stabiliser.

Another objective of this invention, is to provide said intermediate part with an optimum configuration for its use as an intermediate joining part for said lateral boxes.

Another objective of this invention, is to provide an efficient method for manufacturing said intermediate part.

In one aspect, these and other objectives are achieved with a joining arrangement for two lateral boxes of a horizontal tail stabiliser of an aircraft, comprising upper skins and lower skins using an intermediate joining part, both said intermediate part and said lateral boxes being made of composite material, in which said intermediate part comprises a central box, upper and lower lateral flaps to which said skins of the lateral boxes are joined using rivets, fitting plates for the trimming device and fitting plates for the pivoting device.

In the preferred embodiments, said intermediate joining parts are applied to lateral boxes with or without dihedral and to multi-rib or multi-spar boxes using mono-tubular or multi-tubular central boxes as applicable. This results in a joining arrangement applicable to the basic types of lateral boxes of horizontal tail stabilisers of aircraft.

In another aspect, these and other objectives are achieved by methods for manufacturing said intermediate joining part, either with a central mono-tubular box or with a central multi-tubular box, which includes steps to:

a) Provide preforms suitable for forming said part.

b) Form and cure the part made from said preforms using an RTM method.

Other features and advantages of this invention are set out in the following detailed description of an embodiment which illustrates the purpose of the invention in relation to the figures attached.

DETAILED DESCRIPTION OF THE INVENTION

This invention relates to a joining arrangement for two lateral boxes 11, 11' of a horizontal tail stabiliser of an aircraft with an intermediate joining part in which both the lateral boxes 11, 11' and the intermediate part are made of a composite material of carbon fibre-reinforced plastic (CFRP).

Figure 1:
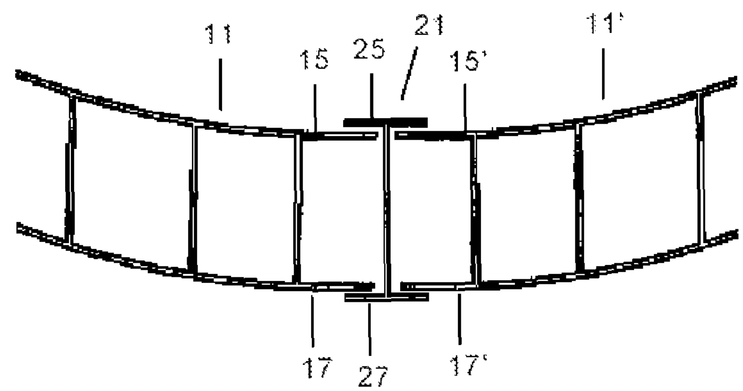
FIG. 1 shows a joining arrangement of two lateral boxes of a horizontal tail stabiliser of an aircraft with a T-shaped intermediate part known in the prior art.

In the case of the joining arrangement described in US 2009159742 which uses a double T-shaped intermediate part, FIG. 1 shows that it is based on the overlap of the flat flanges 25, 27 of the double T-shaped part 21 with the end zones of the skins 15, 17; 15', 17' of the lateral boxes 11, 11', which must be flattened to facilitate the riveted join between them. Furthermore, this joining arrangement enables the structure to be assembled by positioning the lateral boxes 11, 11' in their place and subsequently inserting the part 21 between them, although this creates difficulties with a double T-shaped intermediate part.

Figure 2:
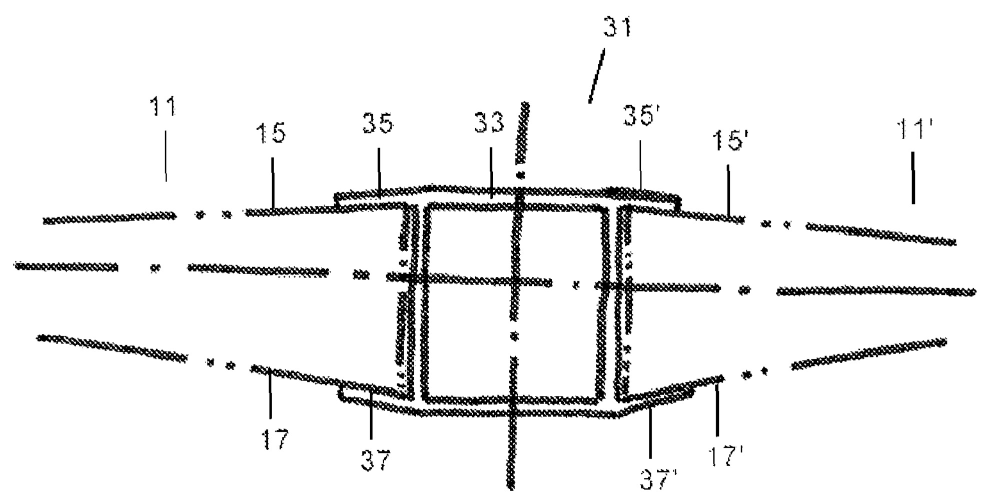
FIG. 2 is a schematic cross section of the joining arrangement of the side boxes of a horizontal tail stabiliser of an aircraft using a central mono-tubular box according to this invention.
Figure 3:
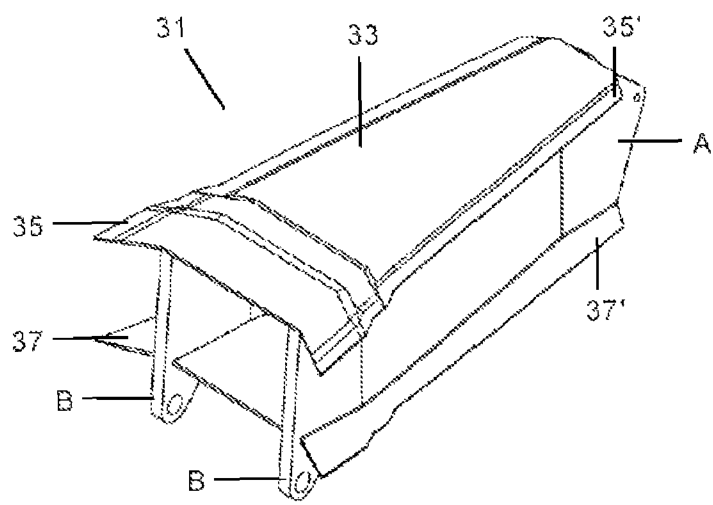
FIG. 3 is a perspective view of an intermediate part in the shape of a mono-tubular box according to this invention used to join the lateral boxes of a horizontal tail stabiliser of an aircraft.
Figure 4:
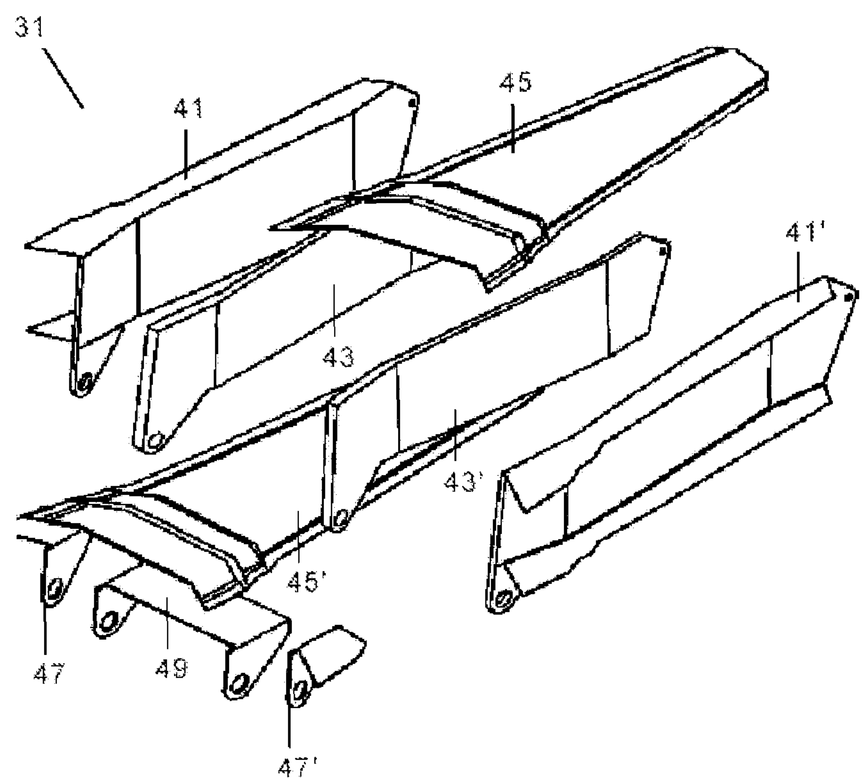
FIG. 4 is a perspective view of the preforms used to manufacture the intermediate part of FIG. 3.

According to a preferred embodiment of this invention illustrated in FIGS. 2, 3 and 4 the joining arrangement for the two lateral boxes 11, 11' of a tail stabiliser of an aircraft is effected using an intermediate part 31 that comprises a mono-tubular central box 33, several upper flaps 35, 35' and lower flaps 37, 37' which are riveted to the end zones of the skins 15,

17; 15', 17' of the lateral boxes 11, 11' and fitting plates A of the trimming device and fitting plates B of the pivoting device.

That intermediate part is manufactured using a resin transfer moulding (RTM) method, i.e. a closed moulding process with resin injection, using the preforms shown in FIG. 4:

two C-shaped preforms 41, 41' and two preforms 43, 43' to form the sides of the part 31 including the fitting plates A of the trimming device and some of the fitting plates B of the pivoting device;

two preforms 45, 45' to form the upper and lower parts of the part 31 together with the flanges of the C-shaped preforms 41, 41';

preforms 47, 47', 49 to complete the fitting plates B of the pivoting device.

The intermediate part 31 manufactured in accordance with said method, using suitable moulds, may be perfectly adapted to different configurations of the boxes 11, 11' for which reason it is applicable to boxes with or without dihedral as well as multi-rib or multi-spar boxes.

Furthermore, the configuration of the part 31 with a central mono-tubular box 33 that integrates the fittings A, B required for the trimming and pivoting devices facilitates the assembly of the horizontal tail stabiliser, positioning the lateral boxes 11, 11' in their place and subsequently inserting the part 31 between them.

Figure 5:
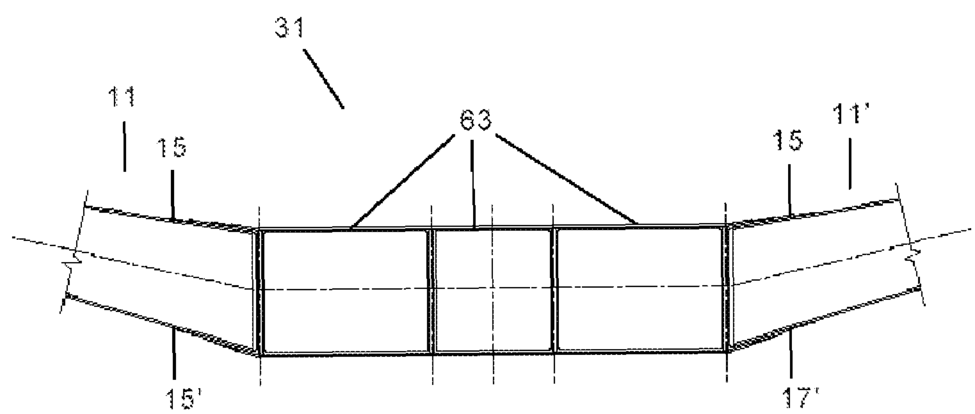
FIGS. 5 and 6 are schematic cross sections of the joining arrangement of the side boxes of a horizontal tail stabiliser of an aircraft, respectively without and with dihedral, using a central multi-tubular box according to this invention.

As shown schematically in FIG. 5, the invention also includes an intermediate part 31 that, instead of a central mono-tubular box, comprises a central multi-tubular box 63 in a joining arrangement for lateral boxes 11, 11' without dihedral that, in turn, would be manufactured using an RTM method from a suitable set of preforms similar to the one used for the part 31 with the central mono-tubular box 33.

Figure 6:
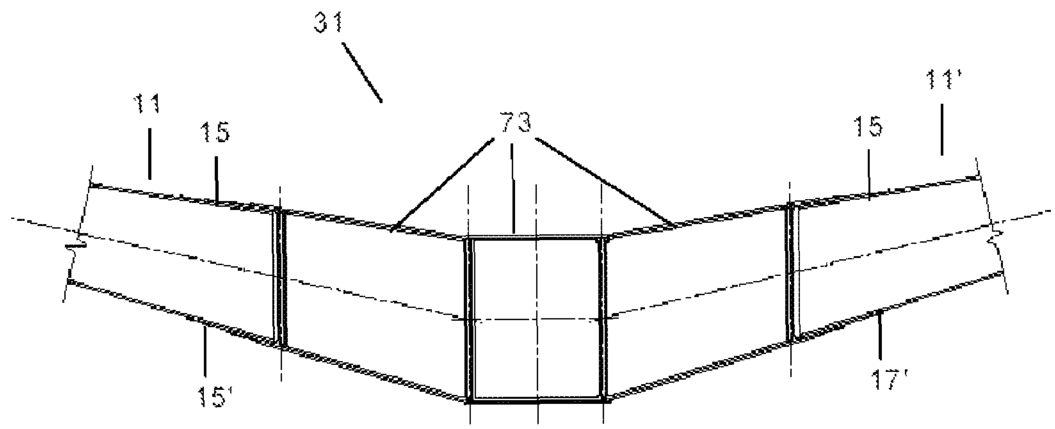
Figure 7:
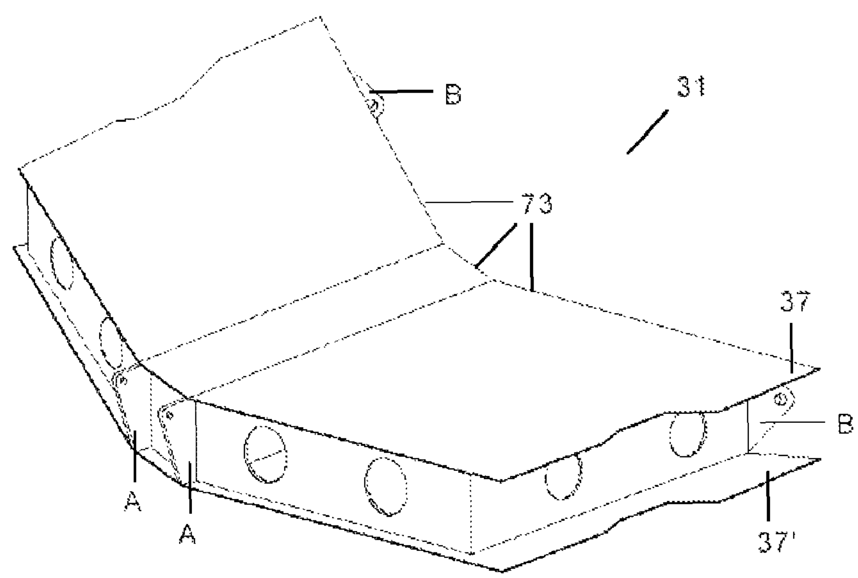
FIG. 7 is a perspective view of the intermediate part in the shape of the multi-tubular box of FIG. 6.

Moreover and as shown schematically in FIGS. 6 and 7, the invention also includes an intermediate part 31 that, instead of a central mono-tubular box, comprises a central multi-tubular box 73 in a joining arrangement for lateral boxes 11, 11' with dihedral that, in turn, would be manufactured using an RTM method from a suitable set of preforms similar to the one used for the part 31 with the central mono-tubular box 33.

As is clear to the person skilled in the art the formation of the part 31 with a central mono-tubular box 33 or with a multi-tubular box 63, 73 is determined by the specific characteristics of the tail stabiliser in question.

The advantages of this invention include the following:

The number of parts used in the join of the boxes 11, 11' is considerably reduced.

The internal faces of the intermediate part 31 in contact with the skins 15, 15', 17, 17' of the lateral boxes have, using suitable tools, an optimum finish, which facilitates compliance with the tolerance requirements in manufacturing and assembly that, as mentioned before, is effected by moving the intermediate part 31, once the lateral boxes 11, 11' are in their position, without any subsequent movement of the boxes 11, 11'.

Although this invention has been described in full in relation to the preferred embodiments, it is clear that any modifications within its scope can be included, this scope not being limited by the foregoing embodiments, but by the content of the claims below.

The invention claimed is:

1. Joining arrangement for two lateral boxes (11, 11') of a horizontal tail stabiliser of an aircraft, comprising upper skins (15, 15'), lower skins (17, 17'), using an intermediate joining part (31) both said part (31) and said lateral boxes (11, 11') being made of composite material, characterized in that said intermediate part (31) comprises a hollow central box (33, 63, 73) positioned laterally between the lateral boxes and including upper (35, 35') and lower (37, 37') lateral flaps to which said skins (15, 15; 17, 17') of the lateral boxes (11, 11') are joined using rivets such that upper (35, 35') and lower (37, 37') lateral flaps overlap said skins (15, 15; 17, 17'), fitting plates (A) for a trimming device and fitting plates (B) for a pivoting device.

2. Joining arrangement according to claim 1, characterized in that the upper (35, 35') and lower (37, 37') lateral flaps have end zones and in that the end zones of the skins (15, 17; 15', 17') of said boxes (11, 11') are not parallel to one another.

3. Joining arrangement according to claim 1, characterized in that the upper (35, 35') and lower (37, 37') lateral flaps have end zones and in that the end zones of the skins (15, 17; 15', 17') of said boxes (11, 11') are parallel to one another.

4. Joining arrangement according to claim 1, characterized in that the lateral boxes (11, 11') extend along respective axes which are not aligned with one another.

5. Joining arrangement according to claim 1, characterized in that said boxes (11, 11') are multi-rib boxes.

6. Joining arrangement according to claim 1, characterized in that said boxes (11, 11') are multi-spar boxes.

7. Joining arrangement according to claim 1, characterized in that said central box (33) is a mono-tubular box.

8. Joining arrangement according to claim 1, characterized in that said central box (63, 73) is a multi-tubular box.

9. Method for manufacturing the intermediate joining part (31) with a central mono-tubular box (33) used in the joining arrangement of claim 7, characterized in that it includes steps to:

a) Provide preforms ((41, 41', 43, 43', 45, 45', 47, 47', 49) suitable for forming said part (31);

b) Form and cure the part (31) made from said preforms (41, 41', 43, 43', 45, 45', 47, 47', 49) using an RTM method.

10. Method for manufacturing the intermediate joining part (31) with a central multi-tubular box (63, 73) used in the joining arrangement of claim 8, characterized in that it includes steps to:

a) Provide preforms suitable for forming said part (31);

b) Form and cure the part (31) made from said preforms using an RTM method.

* * * * *